US008676395B2

(12) United States Patent
Aoki

(10) Patent No.: US 8,676,395 B2
(45) Date of Patent: Mar. 18, 2014

(54) COMMUNICATION TERMINAL, COMPUTER-READABLE STORAGE MEDIUM, AND COMMUNICATION METHOD

(75) Inventor: Norihito Aoki, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 12/866,889

(22) PCT Filed: Mar. 25, 2009

(86) PCT No.: PCT/JP2009/056772
§ 371 (c)(1),
(2), (4) Date: Aug. 9, 2010

(87) PCT Pub. No.: WO2009/123249
PCT Pub. Date: Oct. 8, 2009

(65) Prior Publication Data
US 2011/0035608 A1 Feb. 10, 2011

(30) Foreign Application Priority Data

Apr. 3, 2008 (JP) ................................. 2008-097481

(51) Int. Cl.
*G05D 17/00* (2006.01)
(52) U.S. Cl.
USPC ............................ 700/297; 713/300; 713/340
(58) Field of Classification Search
USPC ............................ 700/295–298; 713/300–340
See application file for complete search history.

(56) References Cited

U.S. PATENT DOCUMENTS

| | | | | |
|---|---|---|---|---|
| 5,631,536 A * | 5/1997 | Tseng | ............................ | 320/137 |
| 5,905,372 A | 5/1999 | Kuffner et al. | ................ | 323/356 |
| 6,756,765 B2 * | 6/2004 | Bruning | ........................ | 320/108 |
| 6,774,604 B2 * | 8/2004 | Matsuda et al. | ............... | 320/110 |
| 6,820,206 B1 * | 11/2004 | Kim et al. | ...................... | 713/300 |
| 7,024,567 B2 * | 4/2006 | Kim et al. | ...................... | 713/300 |
| 7,127,621 B2 * | 10/2006 | Wierzbicki et al. | ........... | 713/300 |
| 7,363,520 B1 * | 4/2008 | Maier et al. | .................... | 713/300 |
| 7,370,219 B1 * | 5/2008 | Kim et al. | ...................... | 713/320 |
| 7,627,288 B2 * | 12/2009 | Iida | .............................. | 455/41.1 |
| 7,752,471 B1 * | 7/2010 | Kolokowsky | ................. | 713/310 |

(Continued)

FOREIGN PATENT DOCUMENTS

| | | |
|---|---|---|
| EP | 0907122 | 4/1999 |
| JP | 2000-90221 | 3/2000 |

(Continued)

OTHER PUBLICATIONS

Gao et al. Power Prediction in Mobile Communication Systems Using an Optimal Neural-Network Structure. IEEE. Nov. 1997.*

(Continued)

*Primary Examiner* — Matthew D Spittle
(74) *Attorney, Agent, or Firm* — Fitzpatrick, Cella, Harper & Scinto

(57) ABSTRACT

A communication terminal includes a first communication unit having a power supply function by electromagnetic induction, and a second communication unit having a communication capability higher than that of the first communication unit. When communicating with a communication partner terminal, it is determined whether to receive power from the communication partner terminal. Upon determining to receive the power by the power supply function of the first communication unit, communication with the communication partner terminal by the second communication unit is controlled using the power supplied from the communication partner terminal by the power supply function of the first communication unit.

10 Claims, 16 Drawing Sheets

(56) References Cited

U.S. PATENT DOCUMENTS

| | | | |
|---|---|---|---|
| 8,069,100 B2* | 11/2011 | Taylor et al. | 705/34 |
| 8,093,749 B1* | 1/2012 | Lew et al. | 307/29 |
| 8,112,641 B2* | 2/2012 | Schindler | 713/300 |
| 2005/0120250 A1 | 6/2005 | Adachi | 713/300 |
| 2006/0223500 A1 | 10/2006 | Osugi et al. | 455/411 |
| 2007/0072474 A1 | 3/2007 | Beasley et al. | 439/332 |
| 2008/0162955 A1* | 7/2008 | Shimizu | 713/300 |
| 2008/0269953 A1* | 10/2008 | Steels et al. | 700/295 |
| 2008/0294558 A1* | 11/2008 | Shimanuki et al. | 705/44 |
| 2012/0290470 A1* | 11/2012 | Lee et al. | 705/39 |

FOREIGN PATENT DOCUMENTS

| | | |
|---|---|---|
| JP | 2003-308500 | 10/2003 |
| JP | 2005-323264 | 11/2005 |
| JP | 2006-306379 | 11/2006 |
| WO | 99/43096 | 8/1999 |
| WO | 03/091943 | 11/2003 |
| WO | 2009/022562 | 2/2009 |

OTHER PUBLICATIONS

Wiegman et al. High Efficiency Battery State Control and Power Capability Prediction. Oct. 1998.*
Ota et al. Wireless Power Transfer by Low Coupling Electromagnetic Induction—LC booster. IEEE. 2012.*
U.S. Appl. No. 12/667,030, filed Dec. 28, 2009, Applicant: Norihito Aoki.
European Search Report dated Dec. 8, 2011 in corresponding European Application No. 09727584.6.
European Office Action dated Jul. 13, 2012 in corresponding European Application No. 09 727 584.6.

* cited by examiner

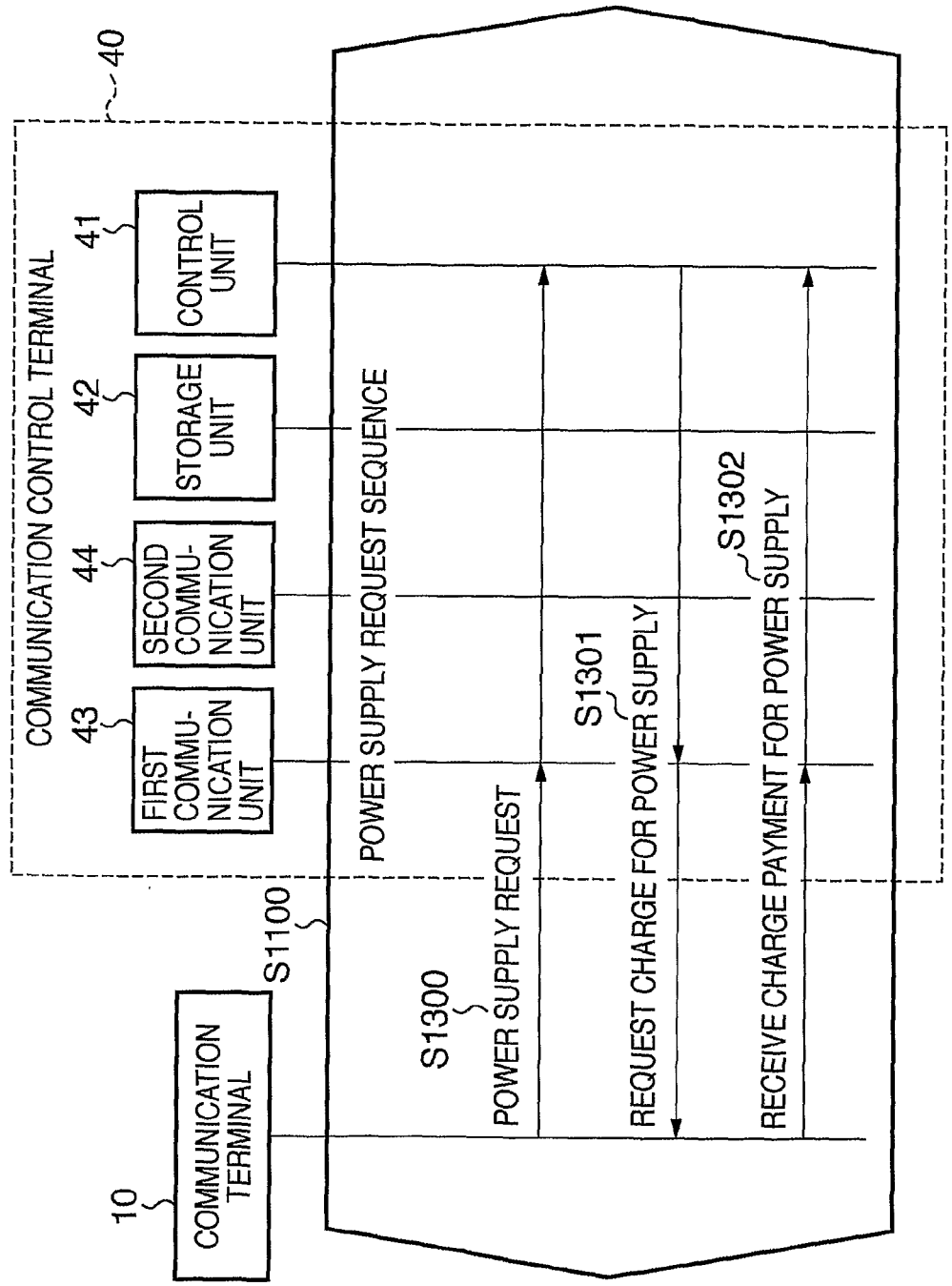

COMMUNICATION TERMINAL, COMPUTER-READABLE STORAGE MEDIUM, AND COMMUNICATION METHOD

TECHNICAL FIELD

The present invention relates to a communication terminal, a computer-readable storage medium, and a communication method, which perform communication using electromagnetic induction.

BACKGROUND ART

A communication terminal which performs communication using a non-contact communication method is known. Japanese Patent Laid-Open No. 2005-323264 describes a technique of detecting the remaining power of a power supply unit on a storage (tag) side in an RFID system, if the remaining power is low, alerting the reader, and causing it to display an alert about the remaining power in the tag. In this case, for example, an induced electromotive force enables power level detection and result notification without consuming power in the tag.

The technique described in Japanese Patent Laid-Open No. 2005-323264 cannot, for example, newly activate an application, although it can detect the remaining power on the tag side. Additionally, for example, even when the remaining power on the tag side is determined to be sufficient, activation of a new application may cause a power shortage. That is, the conventionally proposed technique has not considered a system which predicts power necessary for activation of an application to execute certain processing (e.g., data communication) and operates by receiving a corresponding amount of power.

DISCLOSURE OF INVENTION

The present invention enables provides a communication terminal, a computer-readable storage medium, and a communication method, which increase the reliability of data communication between communication terminals using power supplied by electromagnetic induction.

According to a first aspect of the present invention, there is provided a communication terminal comprising: first communication means having a power supply function by electromagnetic induction; second communication means having a communication capability higher than that of the first communication means; determination means for determining whether to receive power by the power supply function of the first communication means from a communication partner terminal; and communication control means for, if the determination means has determined to receive the power from the communication partner terminal, controlling communication with the communication partner terminal by the second communication means using the power supplied from the communication partner terminal by the power supply function of the first communication means.

According to a second aspect of the present invention, there is provided a communication terminal comprising: first communication means having a power supply function of externally supplying power by electromagnetic induction; second communication means having a communication capability higher than that of the first communication means; power supply means for causing the power supply function of the first communication means to supply, to a communication partner terminal, power for communication with the communication partner terminal; and communication control means for controlling the communication with the communication partner terminal by the second communication means, the communication partner terminal receiving the power from the power supply means via the first communication means.

According to a third aspect of the present invention, there is provided a computer-readable storage medium storing a computer program, the computer program causing a computer incorporated in a communication terminal including first communication means having a power supply function by electromagnetic induction, and second communication means having a communication capability higher than that of the first communication means to function as: determination means for determining whether to receive power by the power supply function of the first communication means from a communication partner terminal; and communication control means for, if the determination means has determined to receive the power from the communication partner terminal, controlling communication with the communication partner terminal by the second communication means using the power supplied from the communication partner terminal by the power supply function of the first communication means.

According to a fourth aspect of the present invention, there is provided a computer-readable storage medium storing a computer program, the computer program causing a computer incorporated in a communication terminal including first communication means having a power supply function of externally supplying power by electromagnetic induction, and second communication means having a communication capability higher than that of the first communication means to function as: power supply means for causing the power supply function of the first communication means to supply, to a communication partner terminal, power for communication with the communication partner terminal; and communication control means for controlling the communication with the communication partner terminal by the second communication means, the communication partner terminal receiving the power from the power supply means via the first communication means.

According to a fifth aspect of the present invention, there is provided a communication method in a communication terminal including first communication means having a power supply function by electromagnetic induction, and second communication means having a communication capability higher than that of the first communication means, comprising: a determination step of determining whether to receive power by the power supply function of the first communication means from a communication partner terminal; and a communication control step of, upon determining to receive the power from the communication partner terminal, controlling communication with the communication partner terminal by the second communication means using the power supplied from the communication partner terminal by the power supply function of the first communication means.

According to a sixth aspect of the present invention, there is provided a communication method in a communication terminal including first communication means having a power supply function of externally supplying power by electromagnetic induction, and second communication means having a communication capability higher than that of the first communication means, comprising: a power supply step of causing the power supply function of the first communication means to supply, to a communication partner terminal, power for communication with the communication partner terminal; and a communication control step of controlling the communication with the communication partner terminal by the second communication means, the communication partner terminal receiving the power by the first communication means in the power supply step.

Further features of the present invention will become apparent from the following description of exemplary embodiments with reference to the attached drawings.

BRIEF DESCRIPTION OF DRAWINGS

FIG. 16 is a second sequence chart showing an example of processing of the power supply request sequence in step S1100 of FIG. 14.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
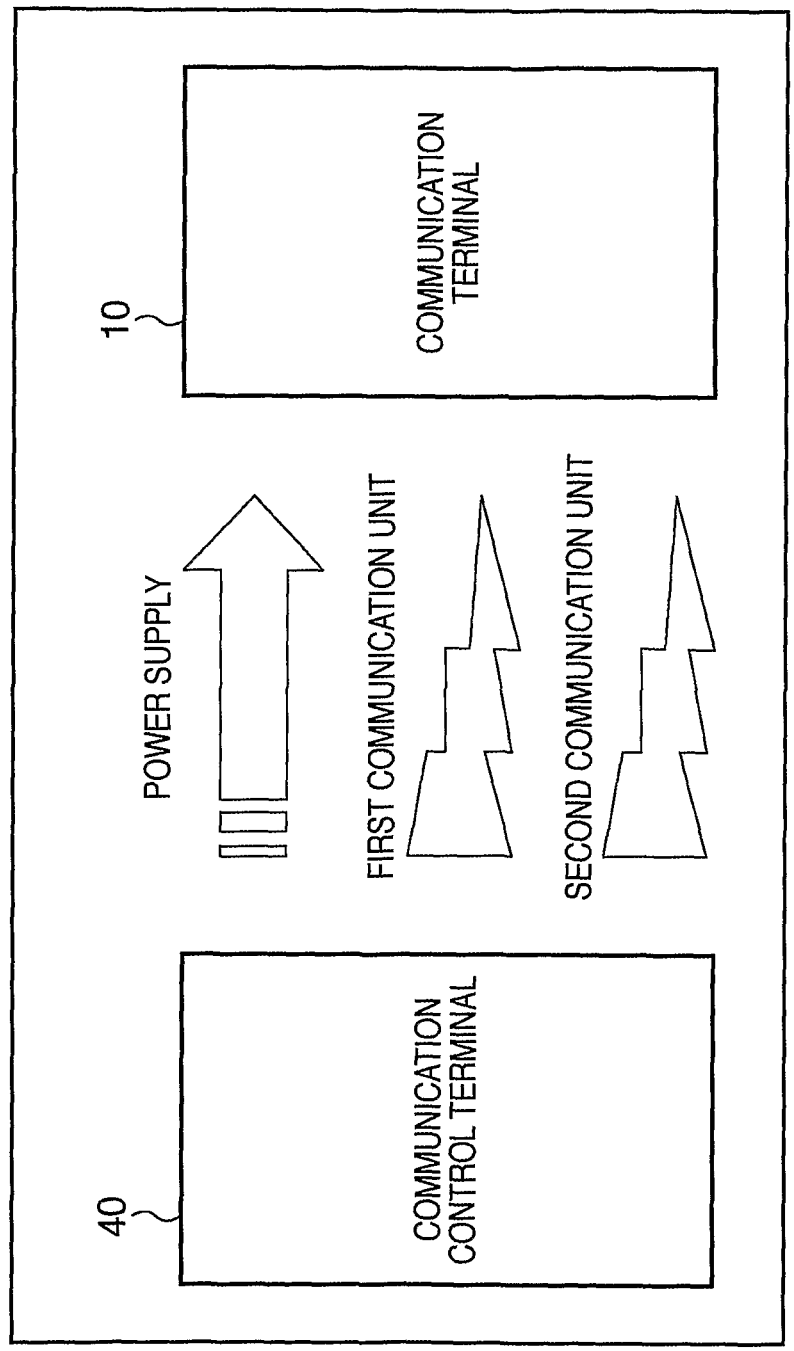
FIG. 1 is a view showing an example of the arrangement of a communication system including a communication terminal according to an embodiment of the present invention.

FIG. 1 is a view showing an example of the arrangement of a communication system including a communication terminal according to an embodiment of the present invention.

A communication control terminal 40 functions to control communication with a communication terminal 10. Each of the communication control terminal 40 and the communication terminal 10 has a plurality (two in the embodiment) of communication (e.g., NFC (Near Field Communication) standard) interfaces and performs data communication using these interfaces. If circumstances require, the communication control terminal 40 supplies power to the communication terminal 10. This power supply is done using, for example, a non-contact communication interface having a power supply function by electromagnetic induction.

Figure 2:
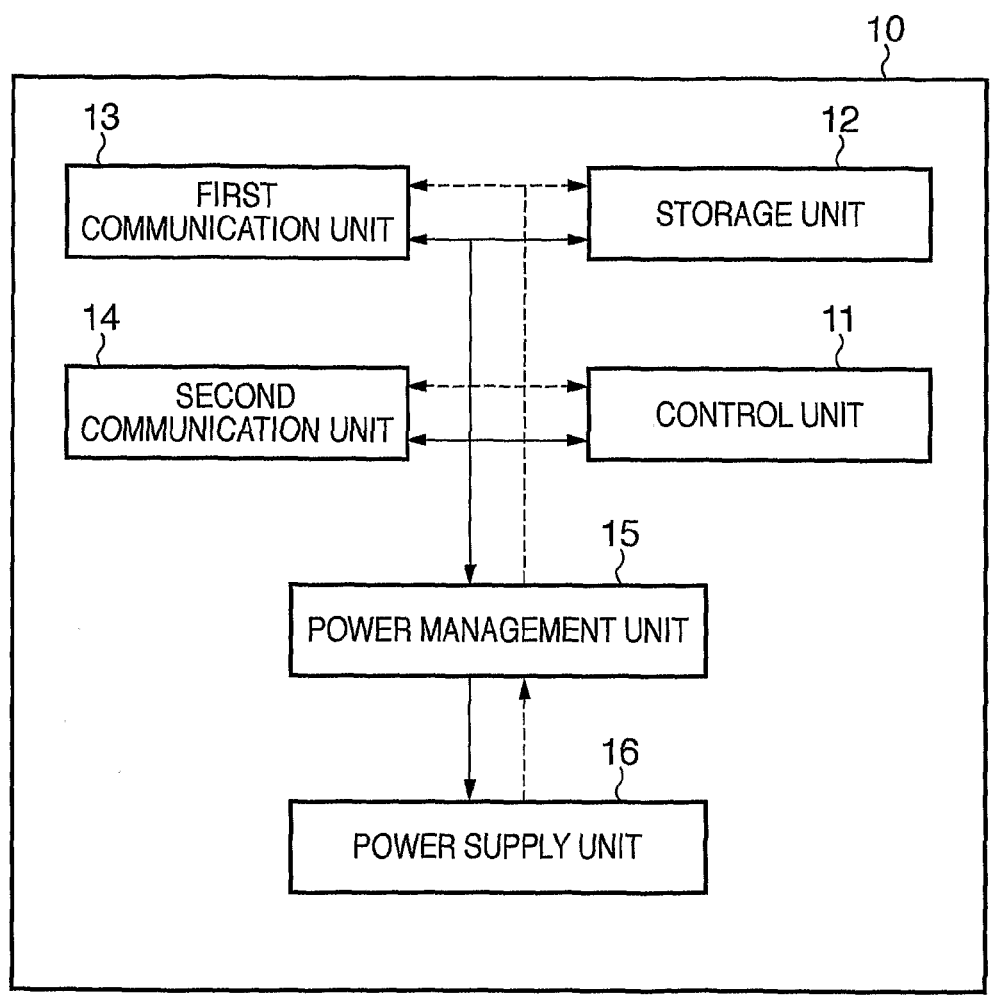
FIG. 2 is a block diagram showing an example of the arrangement of a communication terminal 10 shown in FIG. 1.

FIG. 2 is a block diagram showing an example of the arrangement of the communication terminal 10 shown in FIG. 1.

The communication terminal 10 includes a control unit 11, storage unit 12, first communication unit 13, second communication unit 14, power management unit 15, and power supply unit 16.

The control unit 11 includes, for example, a CPU (Central Processing Unit) and comprehensively controls the entire communication terminal 10 (e.g., controls communication). The storage unit 12 includes, for example, a memory and stores programs and data. The first communication unit 13 is a communication (e.g., NFC (Near Field Communication) standard) interface including, for example, an RFID (Radio Frequency IDentification) reader/writer and having a power supply function by electromagnetic induction. The second communication unit 14 is a communication interface which adopts a communication scheme different from that of the first communication unit 13. Note that the second communication unit 14 needs only be a communication interface having a communication capability higher than that of the first communication unit 13 (the second communication unit 14 enables at least one of mass data communication and high-speed data communication). For example, a communication scheme such as USB (Universal Serial Bus) is usable.

The power management unit 15 monitors the remaining power and manages the power supply output. The power supply unit 16 supplies power to each block via the power management unit 15. The power management unit 15 selectively supplies, to each block, power from the power supply unit 16 or power supplied from another terminal (e.g., communication partner terminal) via the first communication unit 13.

An example of the arrangement of the communication terminal 10 has been described above. The communication terminal 10 is not limited to the above-described arrangement and may additionally include functions of, for example, a storage device, input device, and output device as needed. The communication control terminal 40 also has the same arrangement as the communication terminal 10 described above, and a description thereof will be omitted in this embodiment.

Figure 3:
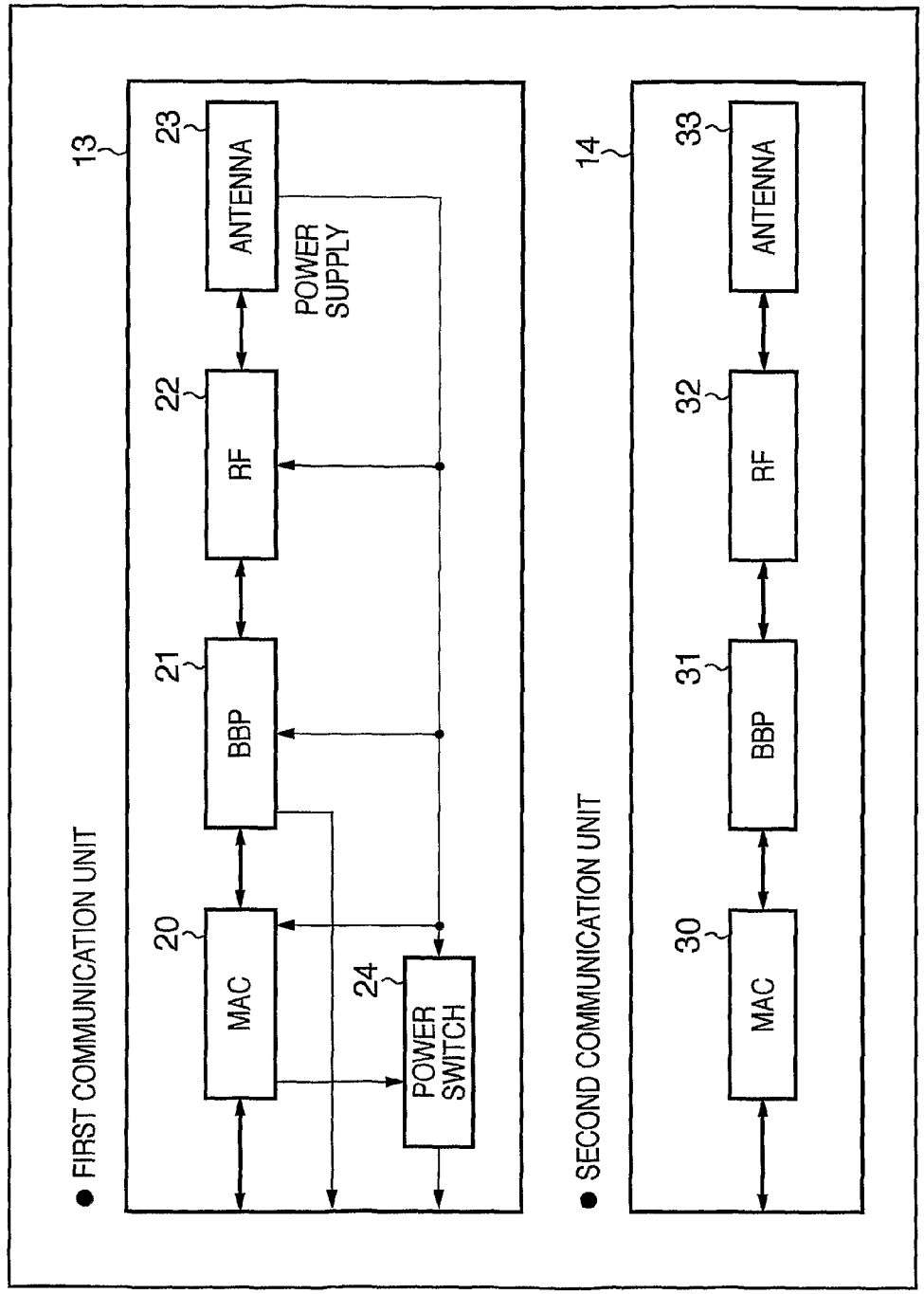
FIG. 3 is a block diagram showing examples of the arrangements of a first communication unit 13 and a second communication unit 14 shown in FIG. 2.

The first communication unit 13 and the second communication unit 14 shown in FIG. 2 will be explained with reference to FIG. 3.

Each of MACs (Medium Access Controllers) 20 and 30 manages a medium access layer. Each of BBPs (Base Band Processors) 21 and 31 has a communication signal processing function such as error correction coding, decoding, and modulation/demodulation. Each of RF (Radio Frequency) blocks 22 and 32 processes a baseband signal in the carrier frequency band. Each of antennas 23 and 33 transmits/receives a modulated signal of the carrier frequency band in a wireless zone.

The first communication unit 13 operates using power supplied by electromagnetic induction from an external device (e.g., communication control terminal 40) or power supplied from itself (power supply unit 16). Electromagnetic induction is caused using the antenna 23. If the first communication unit 13 operates using only power supplied by electromagnetic induction, the transmission speed is expected to be lower. Hence, the first communication unit 13 may operate using even power supplied from itself as needed. The first communication unit 13 includes a power switch 24 whose power supply output is managed by the MAC 20. In the first communication unit 13, a reverse current preventing circuit (not shown) manages reverse current prevention. This management is done by the power switch 24 and a command received by the MAC 20.

Figure 4:
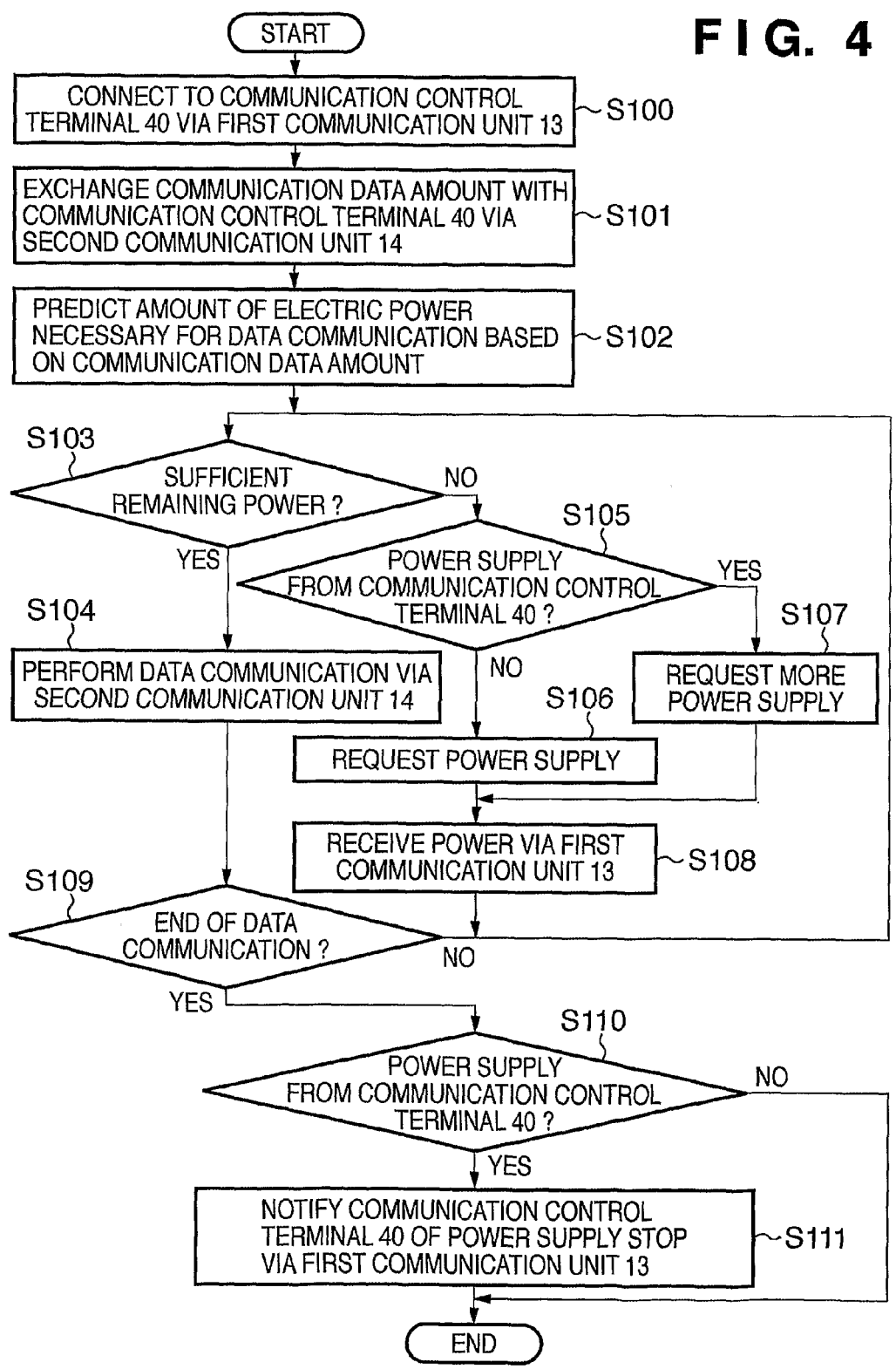
FIG. 4 is a flowchart illustrating an example of the operation of the communication terminal 10 shown in FIG. 1.

An example of the operation of the communication terminal 10 shown in FIG. 1 will be described next with reference to FIG. 4. An example will be explained here in which the communication terminal 10 communicates with the communication control terminal 40 (communication partner terminal).

The communication control terminal 40 supplies power by electromagnetic induction to activate the first communication unit 13 of the communication terminal 10. The communication terminal 10 is connected to the communication control terminal 40 via the first communication unit 13 (S100). The communication terminal 10 exchanges a communication data amount with the communication control terminal 40 connected via the first communication unit 13 (S101). The communication data amount exchange is performed using the second communication unit 14. Note that the communication data can be either uplink data or downlink data to or from the communication control terminal 40.

The communication terminal 10 causes the control unit 11 to notify the power management unit 15 of the communication data amount. Upon receiving the communication data amount, the power management unit 15 calculates and predicts, based on it, an amount of electric power necessary for communication (S102). The power management unit 15 defines the predicted amount of electric power as a predetermined value, and compares it with the remaining power of the power supply unit 16. The power management unit 15 thus determines whether the remaining power of the power supply unit 16 is sufficient (S103).

If the remaining power is sufficient (YES in step S103), the control unit 11 performs data communication via the second communication unit 14 (S104). If the data communication has ended (YES in step S109), the control unit 11 determines whether power from the communication control terminal 40 is being received via the first communication unit 13. If power is being received (YES in step S110), the control unit 11 sends a power supply stop request. More specifically, the control unit 11 notifies the communication control terminal 40 of power supply stop via the first communication unit 13 (S111). Then, the processing ends. If power is not being received (NO in step S110), the processing directly ends.

If it is determined in step S103 that the remaining power is not sufficient (NO in step S103), the control unit 11 determines whether power from the communication control terminal 40 is already being received via the first communication unit 13. If power is already being received (YES in step S105), the control unit 11 requests the communication control terminal 40 to supply more power (S107). If power is not being received (NO in step S105), the control unit 11 sends a power supply request to the communication control terminal 40 via the first communication unit 13 (S106). The communication terminal 10 receives power from the communication control terminal 40 via the first communication unit 13 in response to the request (S108). Then, the communication terminal 10 returns to the processing in step S103.

Figure 5:
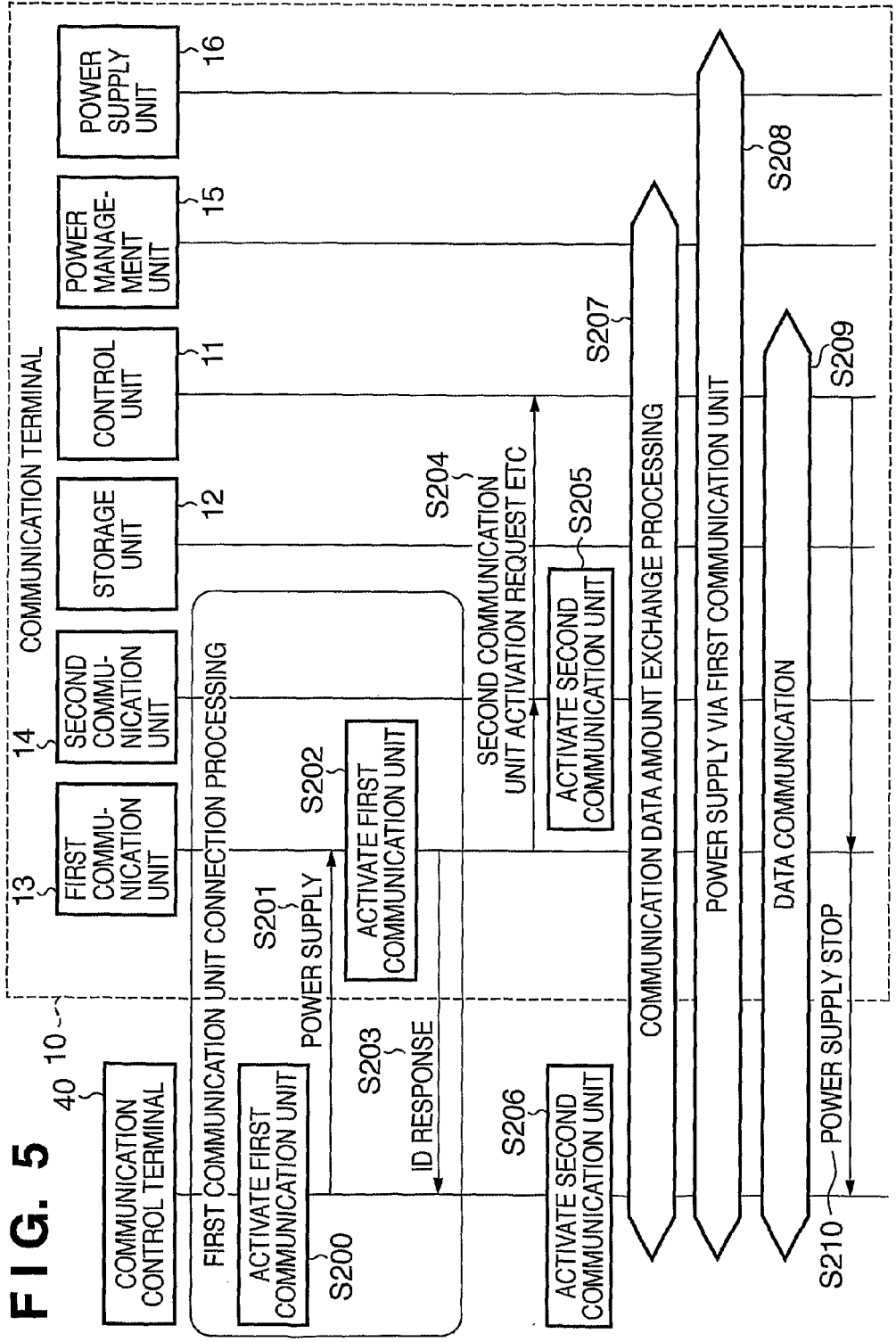
FIG. 5 is a sequence chart showing an example of the sequence of processing of causing the communication terminal 10 shown in FIG. 1 to perform data communication with a communication control terminal 40.

An example of the sequence of processing of causing the communication terminal 10 shown in FIG. 1 to perform data communication with the communication control terminal 40 will be described with reference to FIG. 5.

The communication control terminal 40 activates the first communication unit of its own to communicate with the first communication unit 13 of the communication terminal 10 (S200). This supplies power by electromagnetic induction to the first communication unit 13 of the communication terminal 10 (S201). At this time, the first communication unit 13 of the communication terminal 10 is activated as a storage (S202). The first communication unit 13 of the communication terminal 10 returns, to the communication control terminal 40, a response representing that it is activated as a storage, thereby establishing connection to the communication control terminal 40 (S203).

The first communication unit 13 of the communication terminal 10 requests activation of the second communication unit 14, and notifies the control unit 11 that the first communication unit 13 is activated as a storage (S204). The second communication unit 14 of the communication terminal 10 is activated in response to the activation request (S205). Next, the communication control terminal 40 activates the second communication unit of its own (S206). Then, the communication terminal 10 and the communication control terminal 40 exchange a communication data amount (S207).

Assume that the communication terminal 10 has no sufficient remaining power for data communication corresponding to the exchanged communication data amount. In this case, the communication terminal 10 causes the control unit 11 to request the communication control terminal 40 to supply power for data communication. Power supply to the communication terminal 10 via the first communication unit 13 starts in response to the request (S208). The communication terminal 10 starts data communication with the communication control terminal 40 using the power (S209). When the data communication has ended, the communication terminal 10 requests the communication control terminal 40 to stop power supply (S210).

Figure 6:
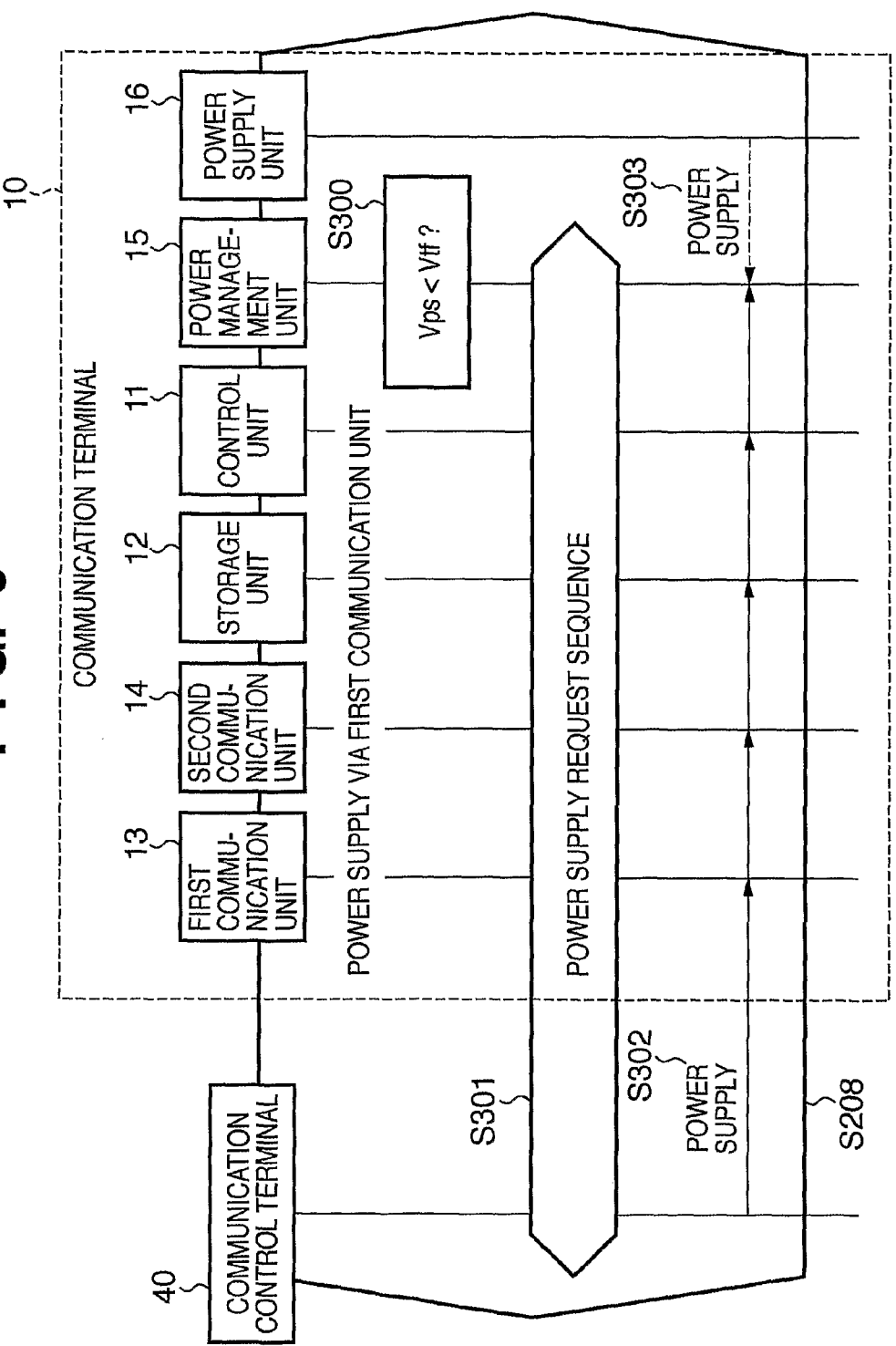
FIG. 6 is a sequence chart showing an example of the sequence of power supply processing in step S208 of FIG. 5.

An example of the sequence of power supply processing in step S208 of FIG. 5 will be described next with reference to FIG. 6.

The communication terminal 10 causes the power management unit 15 to determine whether a voltage level Vps of the power supply unit 16 is equal to or lower than a voltage level Vtf necessary for data communication (S300). If the voltage level Vps of the power supply unit 16 is equal to or lower than Vtf, the communication terminal 10 executes a power supply request sequence (S301). In response to the request, the communication control terminal 40 supplies power to each block of the communication terminal 10 via the first communication unit 13 (S302). Note that the power supply unit 16 never supplies power unless the voltage level exceeds Vtf (S303). This is controlled by the reverse current preventing circuit.

Figure 7:
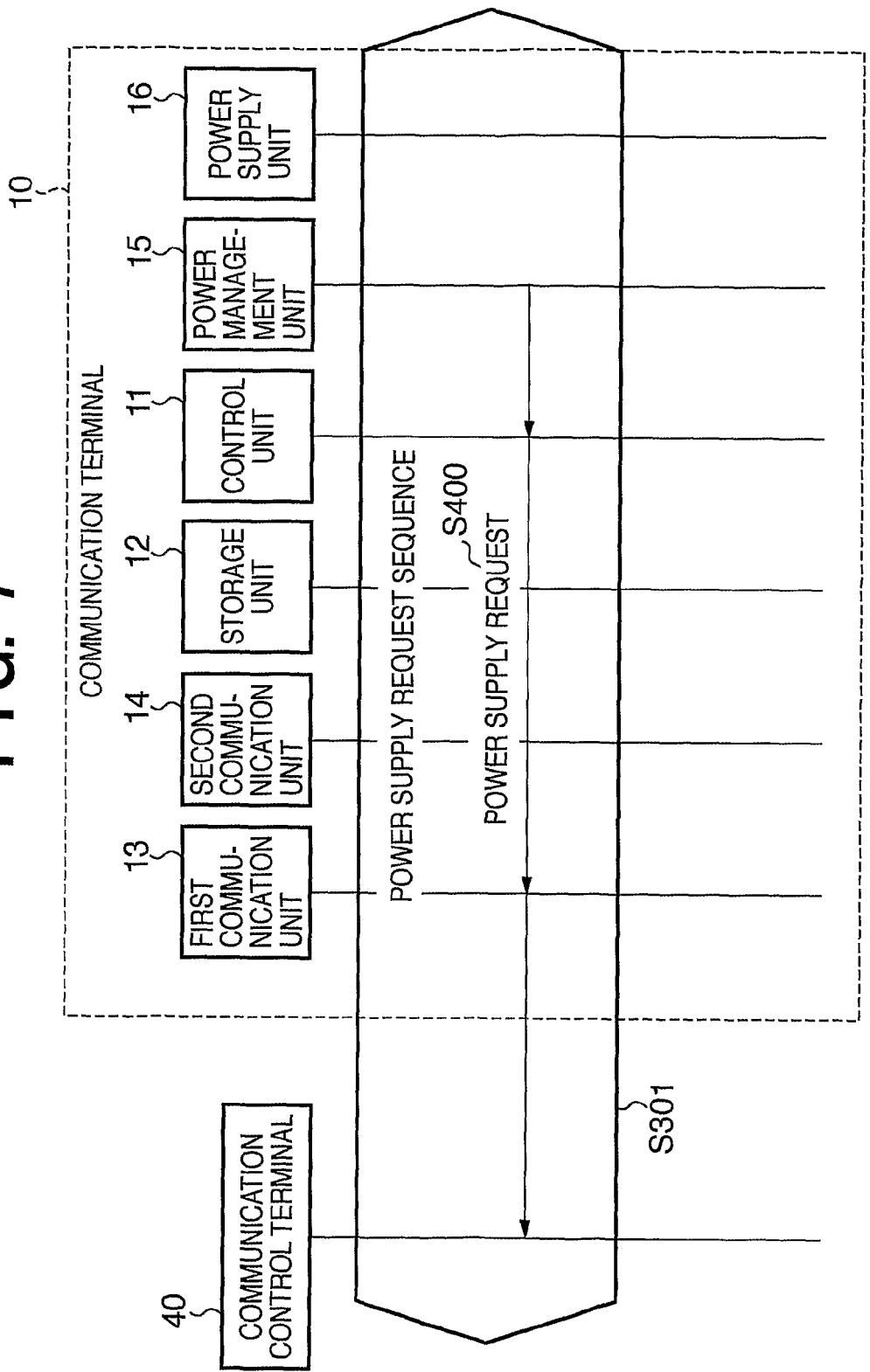
FIG. 7 is a sequence chart showing an example of processing of the power supply request sequence in step S301 of FIG. 6.

An example of processing of the power supply request sequence in step S301 of FIG. 6 will be described next with reference to FIG. 7.

The power management unit 15 notifies the control unit 11 of the determination result in step S300. Upon receiving this, the control unit 11 transmits a power supply request to the communication control terminal 40 via the first communication unit 13 (S400).

As described above, the communication terminal 10 requests the communication control terminal 40 to supply power by electromagnetic induction based on the relationship between remaining power and power necessary for data communication. It is therefore possible to newly activate an application for data communication even when, for example, the remaining power is low. This also prevents, for example, any power shortage during execution of an application and an interrupt of processing. For these reasons, the reliability of data communication increases.

Second Embodiment

The second embodiment will be described next. In the second embodiment, externally supplied power is stored. A communication system and a communication terminal according to the second embodiment have the same arrangements as in FIGS. 1, 2, and 3 described in the first embodiment, and a description thereof will not be repeated. The arrangement of a power supply unit 16 of a communication terminal 10 is slightly different. Unlike the first embodiment, the power supply unit 16 of the second embodiment has a power storage function as a secondary battery.

The operation of the communication terminal 10 according to the second embodiment will be described. The operation of the communication terminal 10 according to the second embodiment is the same as in FIGS. 4 and 5 described in the first embodiment. Only a point different from the first embodiment will be explained here. The different point is the processing in step S208 of FIG. 5 described in the first embodiment.

Figure 8:
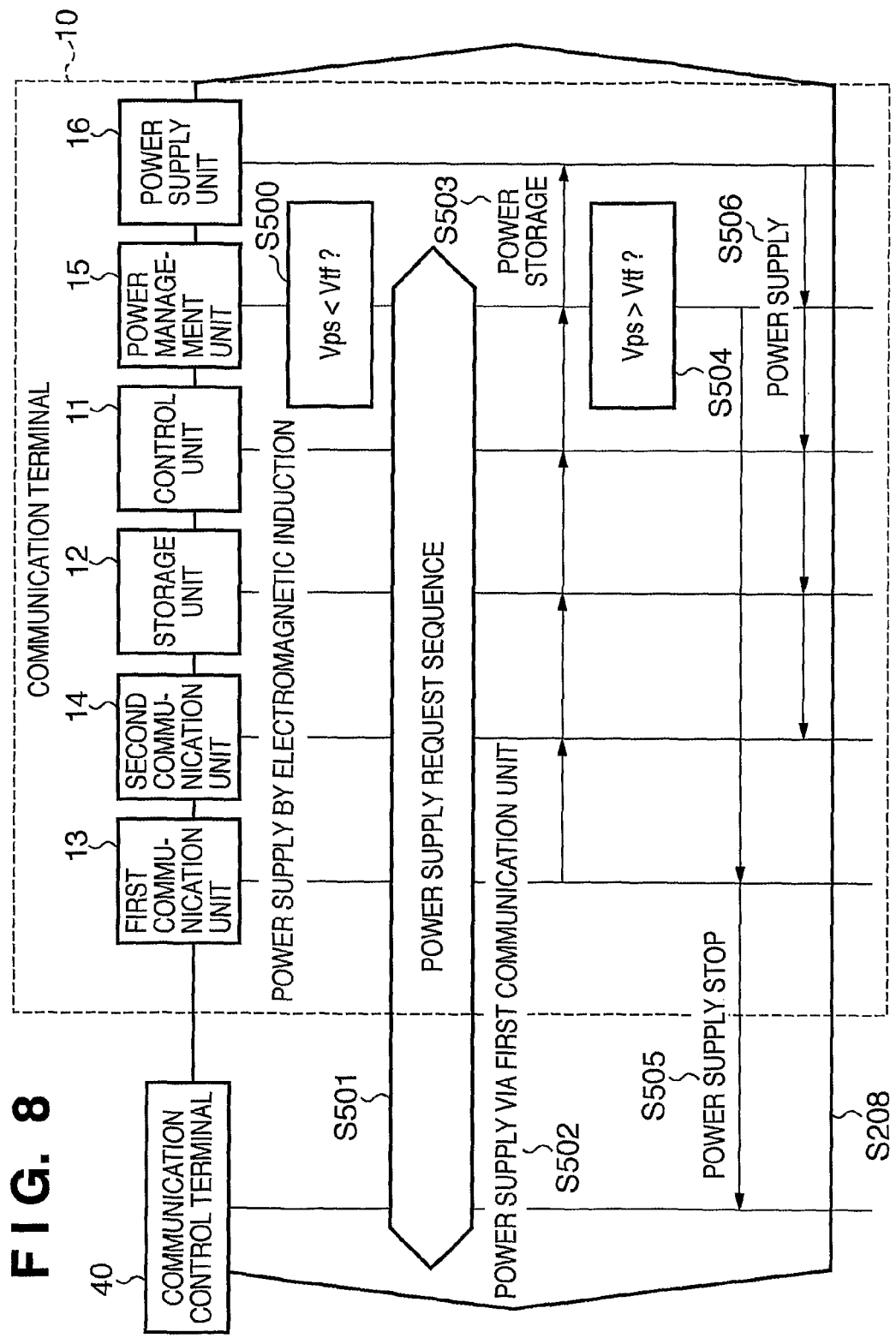
FIG. 8 is a sequence chart showing an example of the sequence of power supply processing according to the second embodiment.

An example of the sequence of power supply processing in step S208 (FIG. 5) according to the second embodiment will be described with reference to FIG. 8.

The communication terminal 10 causes a power management unit 15 to determine whether a voltage level Vps of the power supply unit 16 is equal to or lower than a voltage level Vtf necessary for data communication (S500). If the voltage level Vps of the power supply unit 16 is equal to or lower than Vtf, the communication terminal 10 executes a power supply request sequence (S501). In response to the request, a communication control terminal 40 supplies power to each block of the communication terminal 10 via a first communication unit 13 (S502). At this time, the power supplied from the communication control terminal 40 is supplied to the power supply unit 16 too. The power supply unit 16 stores the power (S503).

Assume that the voltage level Vps of the power supply unit 16 which has stored the power exceeds the voltage level Vtf necessary for data communication. The control unit 11 of the communication terminal 10 notifies the communication control terminal 40 of power supply stop via the first communication unit 13 (S505). After that, the power supply unit 16 starts supplying power to each block of the communication terminal 10 (S506). The communication terminal 10 performs data communication via the second communication unit 14 using the supplied power.

Third Embodiment

The third embodiment will be described next. In the third embodiment, a charge(fee) for externally supplied power is paid. A communication system and a communication terminal according to the third embodiment have the same arrangements as in FIGS. 1, 2, and 3 described in the first embodiment, and a description thereof will not be repeated. The third embodiment is different in that a first communication unit 13 has an electronic settlement function. A power supply unit 16 may have a power storage function as a secondary battery, as in the second embodiment.

The operation of a communication terminal 10 according to the third embodiment will be described. The operation of the communication terminal 10 according to the third embodiment is the same as in FIGS. 4 and 5 described in the first embodiment. Only a point different from the first embodiment will be explained here. The different point is the power supply request sequence (S301 in FIG. 6).

Figure 9:
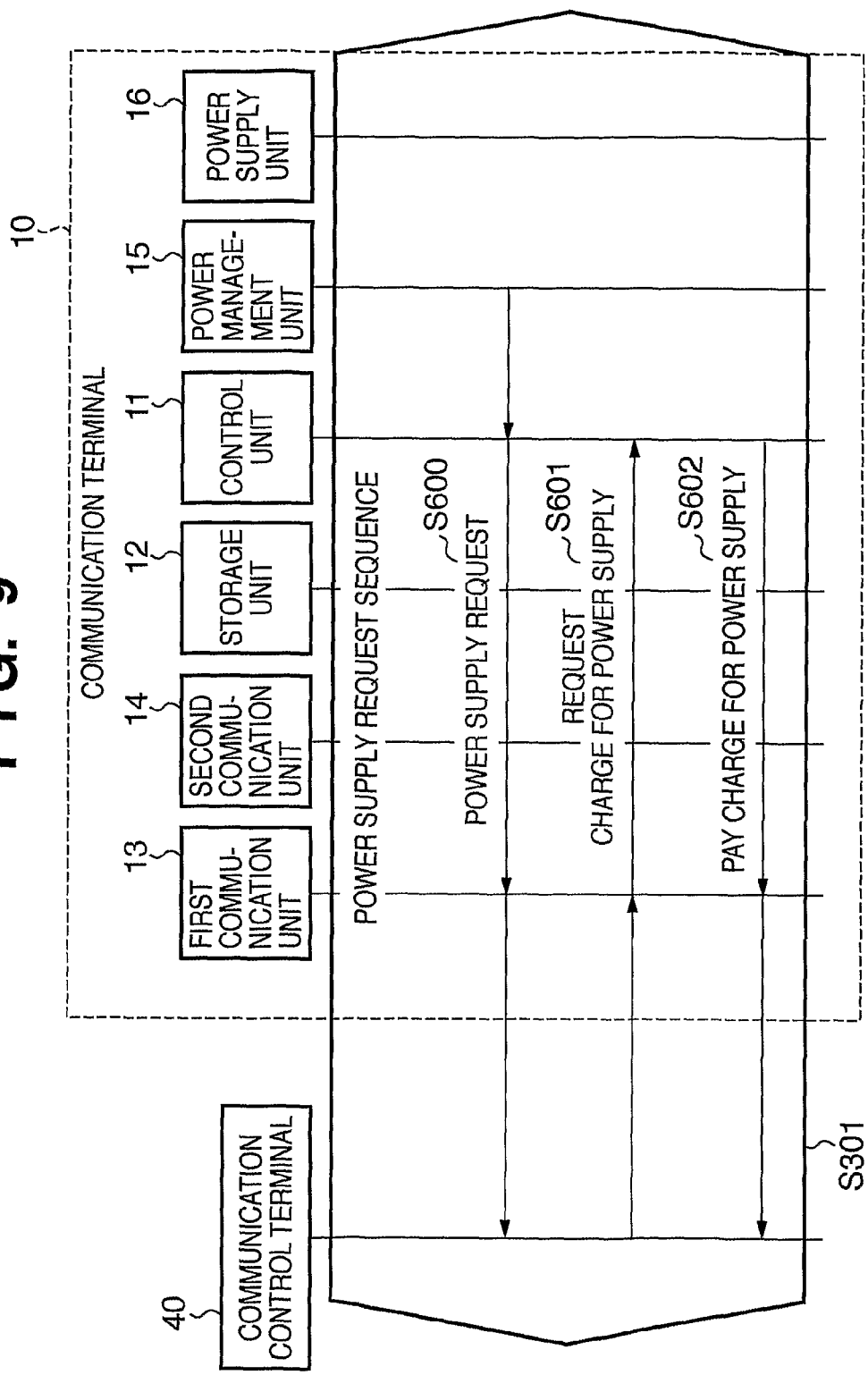
FIG. 9 is a sequence chart showing an example of processing of the power supply request sequence according to the third embodiment.

An example of processing of the power supply request sequence according to the third embodiment will be described with reference to FIG. 9.

A power management unit 15 notifies a control unit 11 of the determination result in step S300. Upon receiving this, the control unit 11 transmits a power supply request to a communication control terminal 40 via the first communication unit 13 (S600).

The communication control terminal 40 requests, of the communication terminal 10, a charge(fee) corresponding to the amount of electric power to be supplied (S601). Upon receiving the request, the control unit 11 of the communication terminal 10 makes a settlement of the requested charge via the first communication unit 13 (S602). In this case, since the charge corresponding to the amount of electric power to be supplied needs to be paid, the communication terminal 10 holds account information corresponding to the amount already paid by the user. The charge request or charge settlement between the communication control terminal 40 and the communication terminal can employ conventional charging processing or settlement processing, and a detailed description thereof will be omitted.

Fourth Embodiment

The fourth embodiment will be described next. In the fourth embodiment, the arrangement and operation of a communication control terminal 40 will be described. A communication system according to the fourth embodiment has the same arrangement as in FIGS. 1, 2, and 3 described in the first embodiment, and a description thereof will not be repeated.

Figure 10:
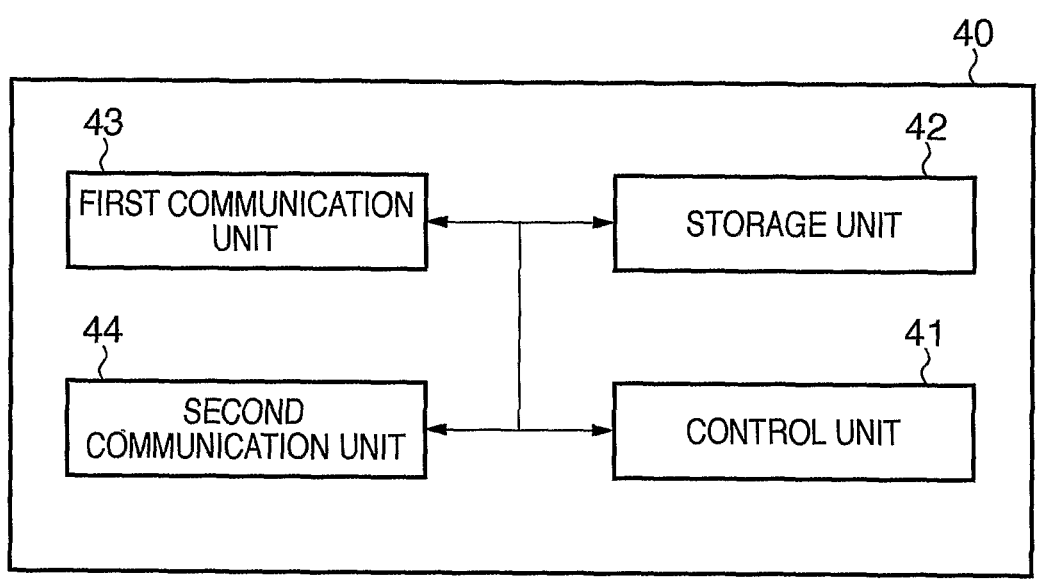
FIG. 10 is a block diagram showing an example of the arrangement of a communication control terminal 40 according to the fourth embodiment.

An example of the arrangement of the communication control terminal 40 according to the fourth embodiment will be described with reference to FIG. 10.

The communication control terminal 40 includes a control unit 41, storage unit 42, first communication unit 43, and second communication unit 44. The communication control terminal 40 also includes a power supply unit and the like, although a description thereof will be omitted.

The control unit 41 provides the same function as a control unit 11 of a communication terminal 10. The storage unit 42 provides the same function as a storage unit 12 of the communication terminal 10. The first communication unit 43 provides the same function as a first communication unit 13 of the communication terminal 10. The second communication unit 44 provides the same function as a second communication unit 14 of the communication terminal 10.

An example of the arrangement of the communication control terminal 40 has been described above. Like the above-described communication terminal 10, the communication control terminal 40 is not limited to the above-described arrangement and may additionally include functions of, for example, a storage device, input device, and output device as needed.

Figure 11:
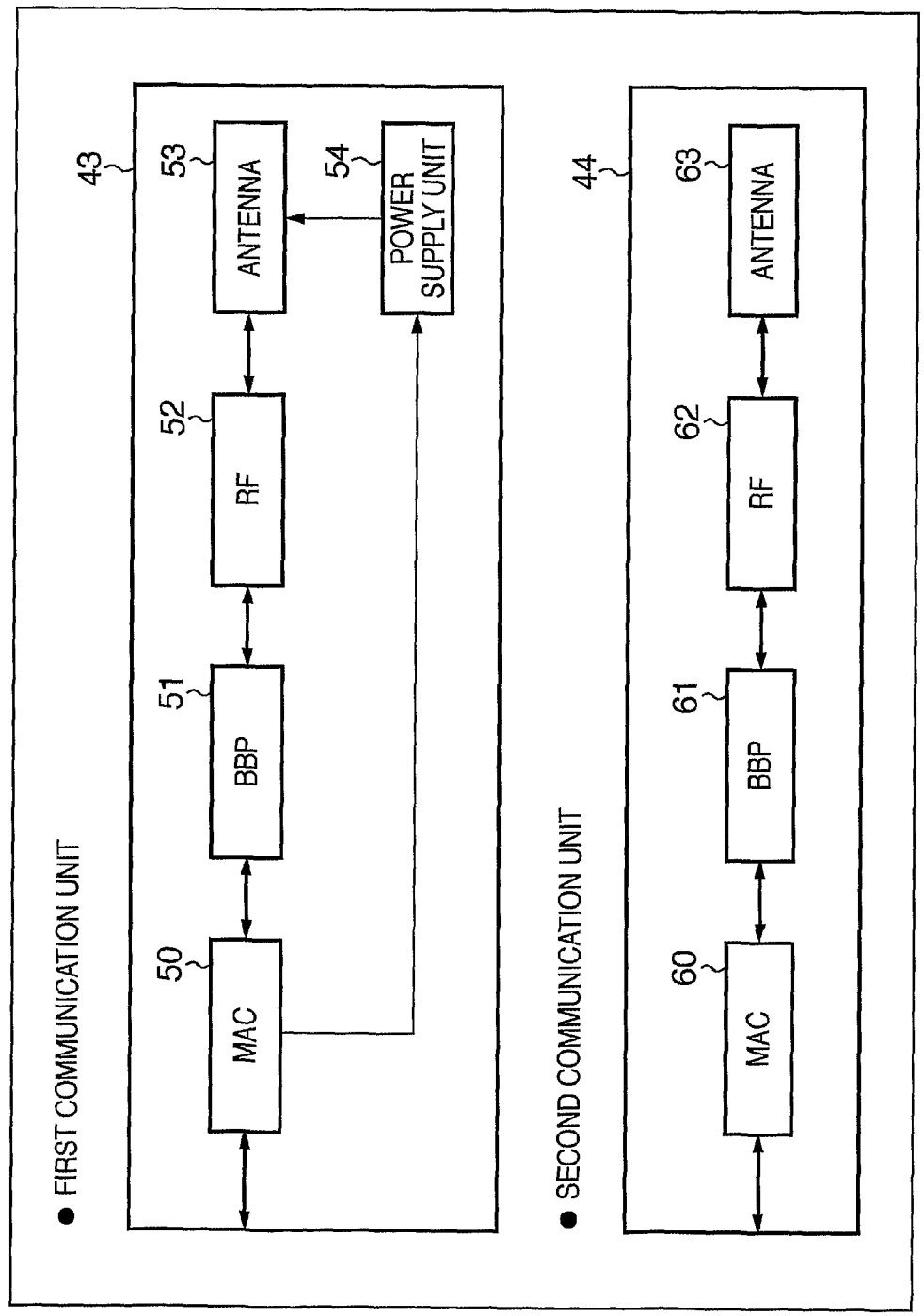
FIG. 11 is a block diagram showing examples of the arrangements of a first communication unit 43 and a second communication unit 44 shown in FIG. 10.

The first communication unit 43 and the second communication unit 44 shown in FIG. 10 will be described next with reference to FIG. 11.

MACs 50 and 60 provide the same function as the MACs 20 and 30 (described with reference to FIG. 3). BBPs 51 and 61 provide the same function as the BBPs 21 and 31. RFs 52 and 62 provide the same function as the RFs 22 and 32. Antennas 53 and 63 provide the same function as the antennas 23 and 33.

The first communication unit 43 of the communication control terminal 40 includes a power supply unit 54 which supplies power via the antenna 53. More specifically, the communication control terminal 40 supplies, using the power supply unit 54, power to the communication terminal 10 via its first communication unit 13. Note that the MAC 50 controls the power supply unit 54.

Figure 12:
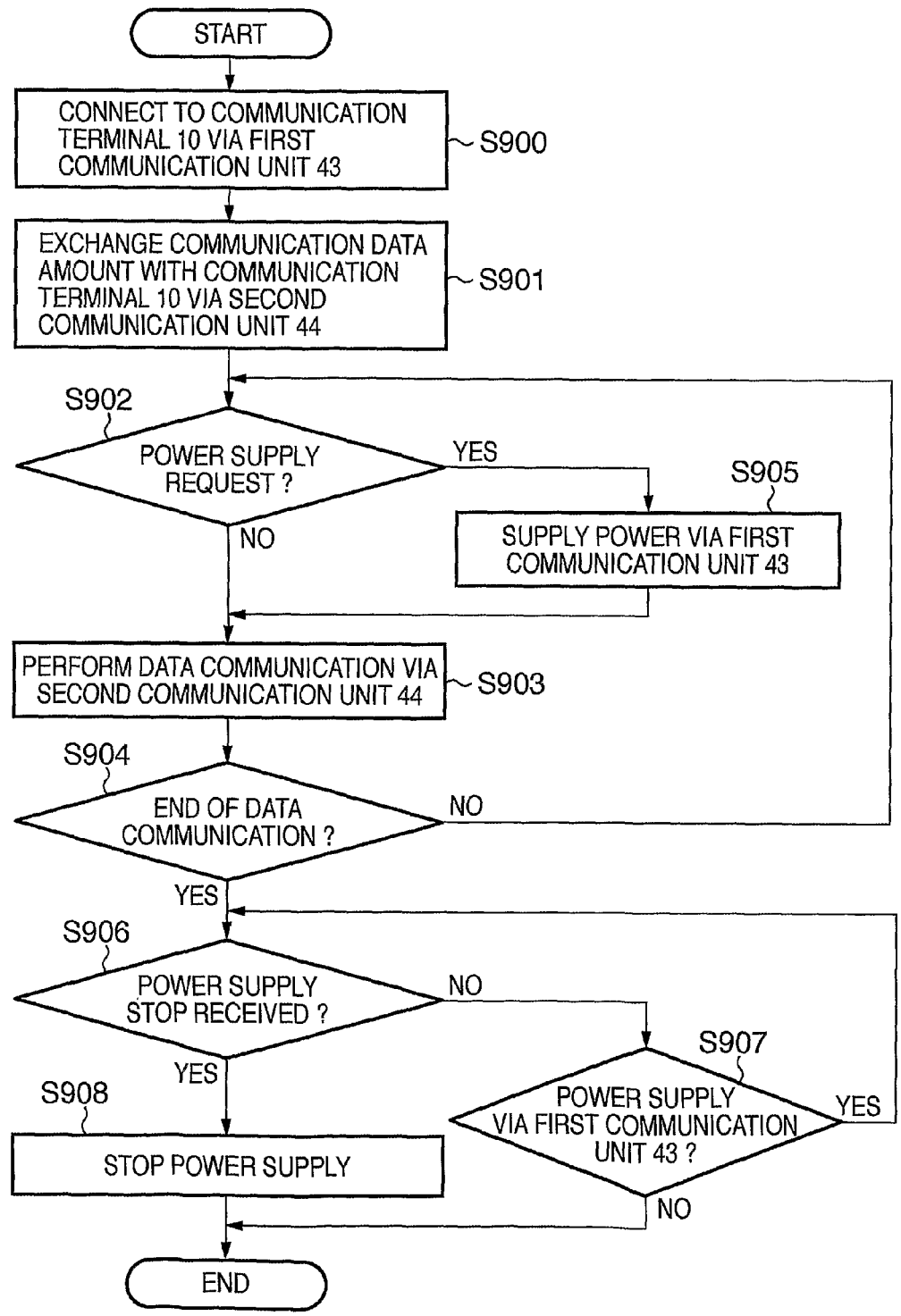
FIG. 12 is a flowchart illustrating an example of the operation of the communication control terminal 40 according to the fourth embodiment.

An example of the operation of the communication control terminal 40 according to the fourth embodiment will be described next with reference to FIG. 12.

The communication control terminal 40 supplies power to the first communication unit 13 of the communication terminal 10 via the first communication unit 43. The communication control terminal 40 is thus connected to the communication terminal 10 (S900). The communication control terminal 40 exchanges a communication data amount with the communication terminal 10 via the second communication unit 44 (S901). Note that the communication data can be either uplink data or downlink data to or from the communication terminal 10.

The communication control terminal 40 causes the control unit 41 to determine whether a power supply request is received from the communication terminal 10. Note that the power supply request reception is done using the first communication unit 43. If a power supply request is received (YES in step S902), the communication control terminal 40 supplies power corresponding to the received necessary amount of electric power to the communication terminal 10 via the first communication unit 43 (S905).

Then, the control unit 41 of the communication control terminal 40 performs data communication via the second communication unit 44 (S903). If the data communication has ended (YES in step S904), the control unit 41 determines whether a power supply stop is received from the communication terminal 10. If a power supply stop is received (YES in step S906), the communication control terminal 40 causes the control unit 41 to stop power supply via the first communication unit 43 (S908), and ends the processing. If no power supply stop is received (NO in step S906), the communication control terminal 40 causes the control unit 41 to determine whether power is being supplied. If power is being supplied (YES in step S907), the process returns to step S906. If no power is being supplied (NO in step S907), the processing ends.

Figure 13:
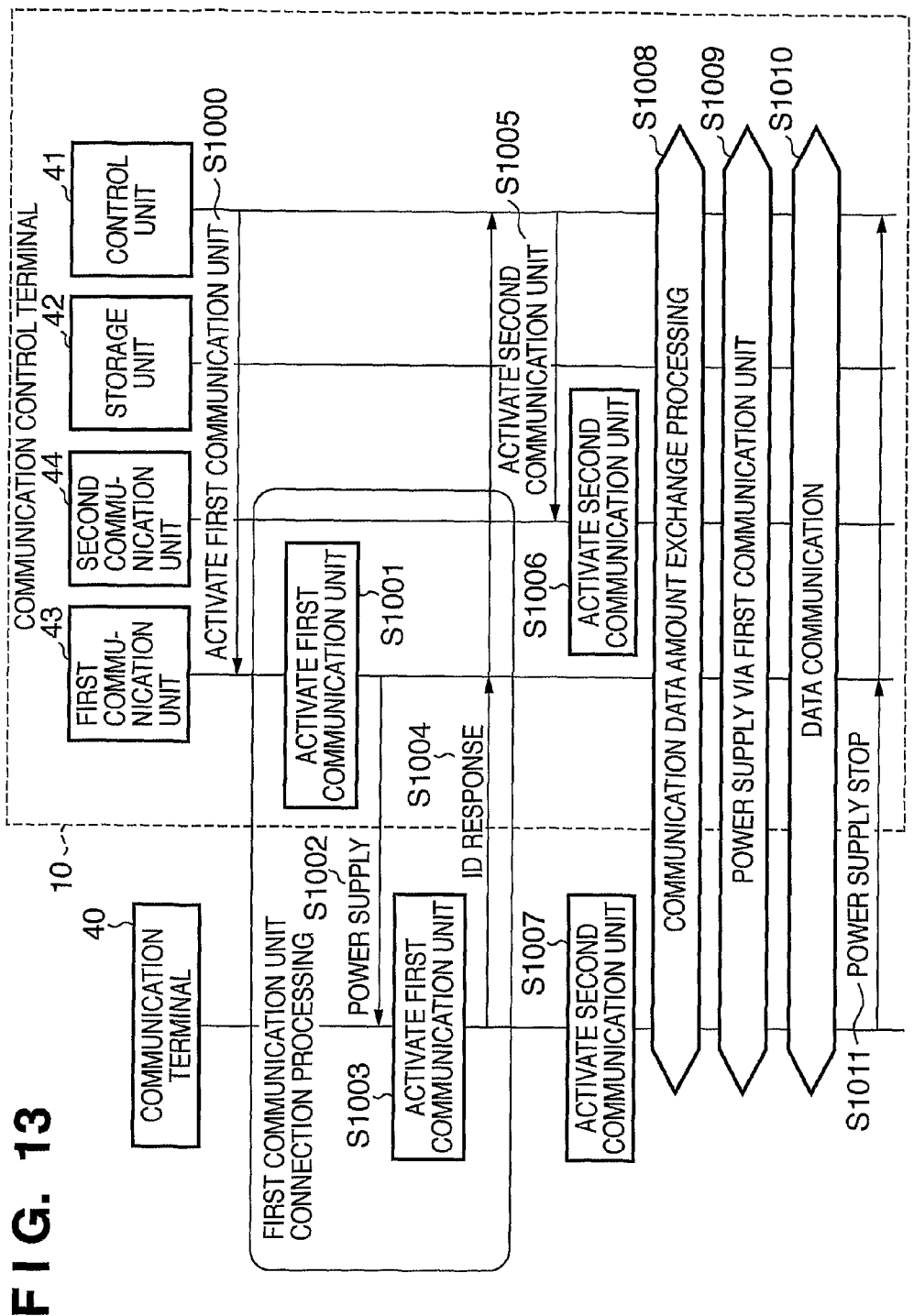
FIG. 13 is a sequence chart showing an example of the sequence of processing of causing the communication control terminal 40 shown in FIG. 10 to perform data communication with a communication terminal 10.

An example of the sequence of processing of causing the communication control terminal 40 shown in FIG. 10 to perform data communication with the communication terminal 10 will be described with reference to FIG. 13.

The communication control terminal 40 causes the control unit 41 to issue a command to request activation of the first communication unit 43 (S1000). Upon receiving the command, the MAC 50 of the first communication unit 43 activates the power supply unit 54. This activates the first communication unit 43 of the communication control terminal 40 (S1001).

Upon receiving power supplied from the first communication unit 43 of the communication control terminal 40 (S1002), the first communication unit 13 of the communication terminal 10 is activated (S1003). The first communication unit 13 of the communication terminal 10 returns, to the communication control terminal 40, a response representing that it is activated as a storage, thereby establishing connection to the communication control terminal 40 (S1004).

The communication control terminal 40 causes the control unit 41 to issue a command to request activation of the second communication unit 44 (S1005). This activates the second communication unit 44 of the communication control terminal 40 (S1006). The second communication unit 14 of the communication terminal 10 is also activated (S1007). Then, the communication control terminal 40 and the communication terminal 10 exchange a communication data amount (S1008).

Assume that the communication terminal 10 has no sufficient remaining power for data communication corresponding to the exchanged communication data amount. In this case, the communication terminal 10 requests, via the first communication unit 13, power supply for data communication of the communication control terminal 40 (S1009). In response to the request, the communication control terminal 40 starts power supply to the communication terminal 10 via the first communication unit 43.

The communication control terminal 40 starts data communication with the communication terminal 10 (S1010). When the data communication has ended, the communication terminal 10 requests the communication control terminal 40 to stop power supply (S1011).

Figure 14:
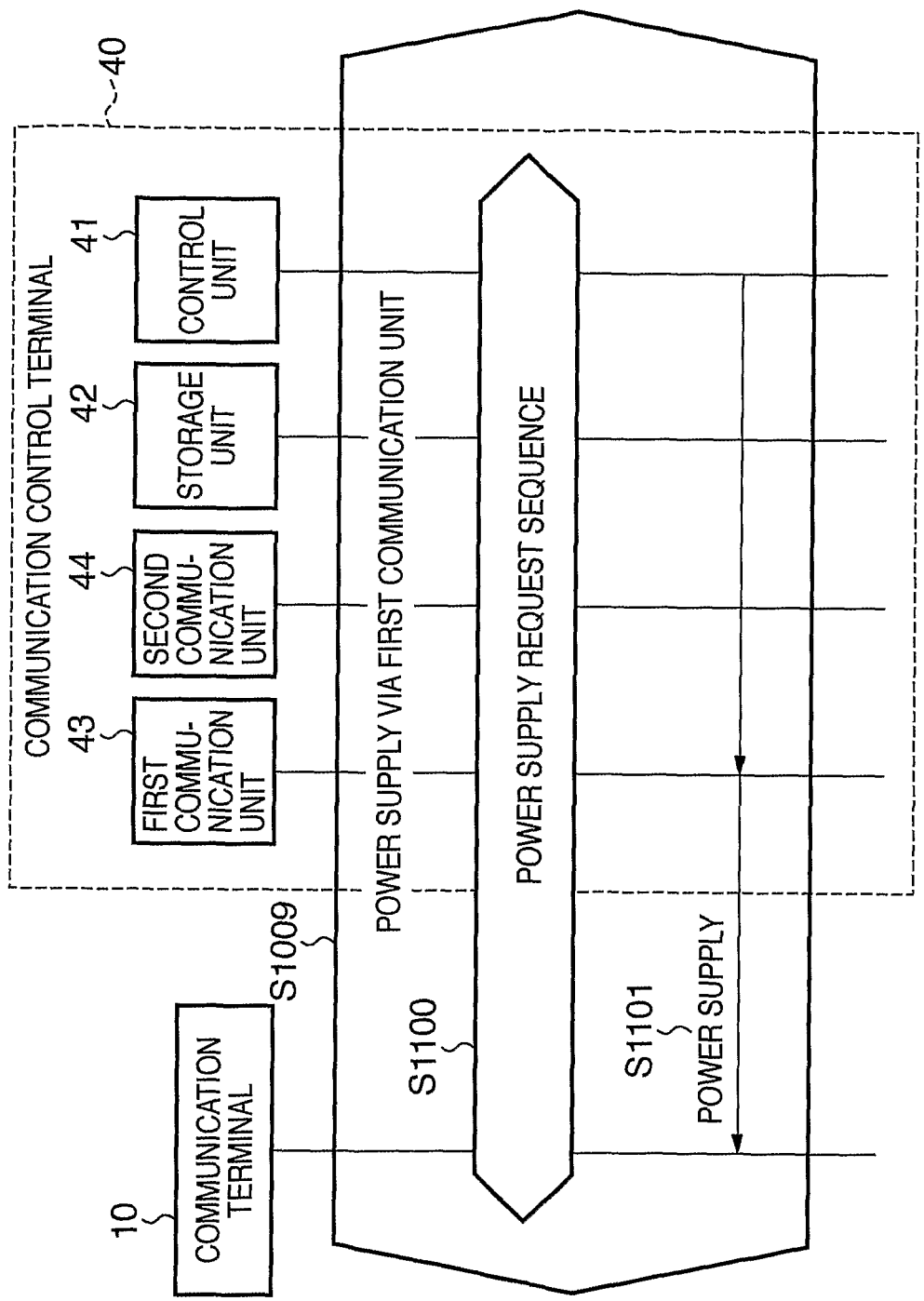
FIG. 14 is a sequence chart showing an example of the sequence of power supply processing in step S1009 of FIG. 13.

An example of the sequence of power supply processing in step S1009 of FIG. 13 will be described next with reference to FIG. 14.

The communication terminal 10 executes a power supply request sequence (S1100). In response to the request, the communication control terminal 40 starts power supply to the communication terminal 10 via the first communication unit 43 (S1101).

Figure 15:
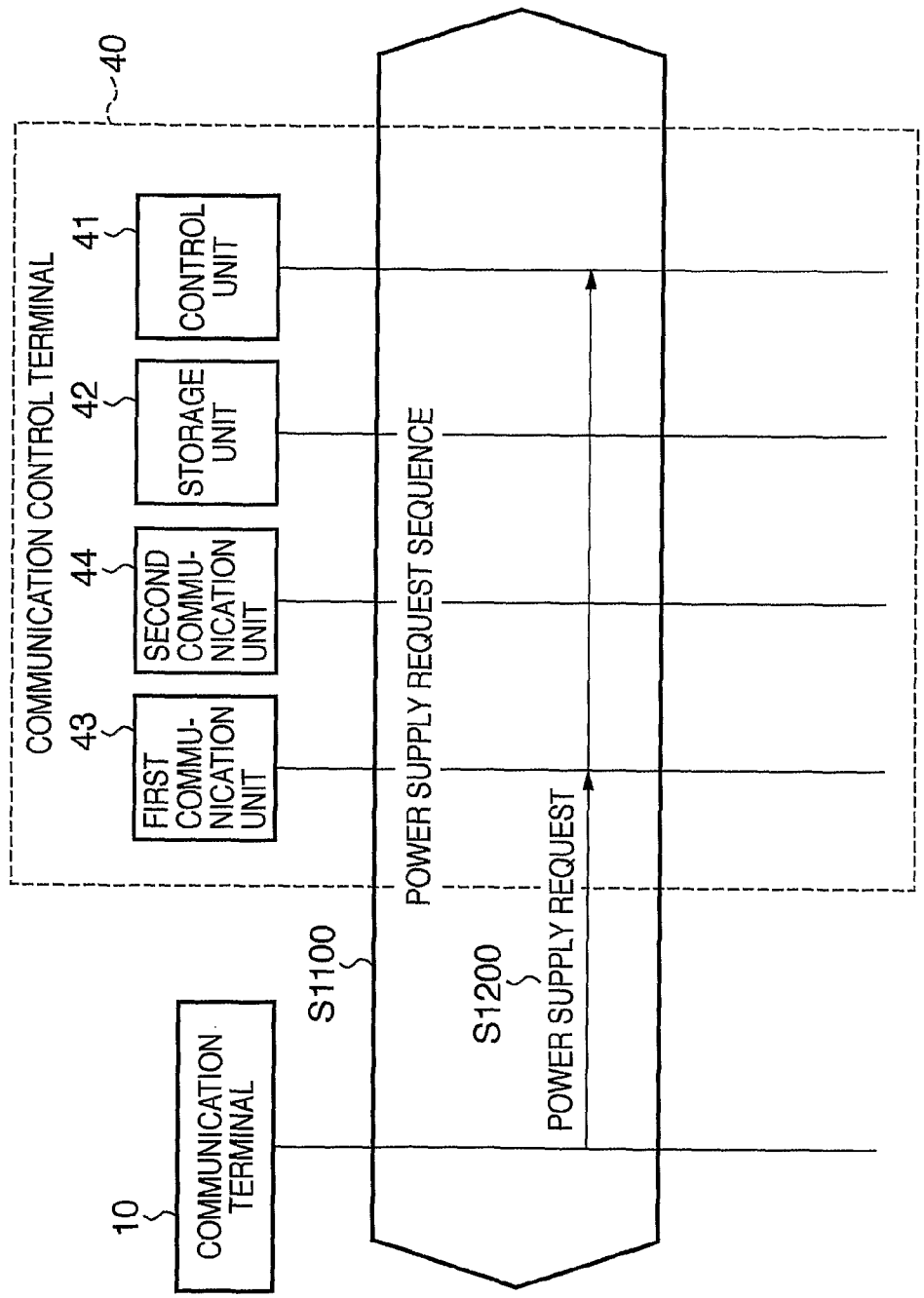
FIG. 15 is a first sequence chart showing an example of processing of the power supply request sequence in step S1100 of FIG. 14.

An example of processing of the power supply request sequence in step S1100 of FIG. 14 will be described next with reference to FIG. 15.

The communication terminal 10 transmits a power supply request to the communication control terminal 40 (S1200). The communication control terminal 40 causes the control unit 41 to receive the power supply request via the first communication unit 43.

An example of processing of the power supply request sequence when requesting payment of a charge for power to be supplied, as in the second embodiment, will be described with reference to FIG. 16.

The communication terminal 10 transmits a power supply request to the communication control terminal 40. The communication control terminal 40 receives the power supply request via the first communication unit 43 (S1300). The communication control terminal 40 causes the control unit 41 to request, of the communication terminal 10, a charge corresponding to the amount of electric power to be supplied (S1301). When the communication terminal 10 has made a settlement of the charge, the communication control terminal 40 causes the control unit 41 to receive the payment via the first communication unit 43 (S1302).

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, the following media can be used. For example, a Floppy® disk, hard disk, optical disk, magneto-optical disk, MO, CD-ROM, CD-R, CD-RW, magnetic tape, nonvolatile memory card, ROM, and DVD (DVD-ROM, DVD-R) can be used.

As another program supply method, the user establishes connection to a website on the Internet using a browser on a client computer, and downloads the computer program of the present invention from the website onto a recording medium such as a hard disk. In this case, the program to be downloaded may be a compressed file including an automatic installation function. Also, program codes that form the program of the present invention may be segmented into a plurality of files, which may be downloaded from different websites. That is, the present invention includes a WWW server, which makes a plurality of users download program files required to implement the functional processing of the present invention on their computers.

Also, a storage medium such as a CD-ROM, which stores the encrypted program of the present invention, may be delivered to the user. In this case, the user who has cleared a predetermined condition may be allowed to download key information used to decrypt the encrypted program from a website via the Internet. The user executes the encrypted program using that key information to install the program in a computer.

The functions of the aforementioned embodiments can be implemented when the computer executes the readout program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented when the program read out from the recording medium is written in a memory equipped on a function expansion board or a function expansion unit, which is inserted into or connected to the computer. In this case, after the program is written in the function expansion board or unit, a CPU or the like equipped on the function expansion board or unit executes some or all of actual processes based on an instruction of that program.

According to the present invention, it is possible to increase the reliability of data communication between communication terminals using power supplied by electromagnetic induction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-097481 filed on Apr. 3, 2008, which is hereby incorporated by reference herein in its entirety.

The invention claimed is:

1. A communication terminal comprising:
a first communication unit having a power supply function by electromagnetic induction;
a second communication unit having a communication capability higher than that of the first communication unit;
a power management unit configured to predict an amount of electric power necessary for the communication with the communication partner terminal by the second communication unit and determine, based on a relationship between remaining power and the predicted amount of electric power, whether to receive power by the power supply function of the first communication unit from a communication partner terminal; and
a communication control unit configured to, if the power management unit has determined to receive the power from the communication partner terminal, control communication with the communication partner terminal by the second communication unit using the power supplied from the communication partner terminal via the first communication unit.

2. The terminal according to claim 1, wherein the communication terminal stores the power supplied from the communication partner terminal via the first communication unit.

3. The terminal according to claim 1, wherein the communication control unit controls communication for requesting the communication partner terminal to supply power if the power management unit has determined to receive the power by the first communication unit and wherein the communication control unit controls communication for requesting the communication partner terminal to stop power supply if the power management unit has determined that it is unnecessary to receive the power.

4. A computer-readable storage medium storing a computer program, the computer program causing a computer incorporated in a communication terminal including a first communication unit having a power supply function by electromagnetic induction, and a second communication unit having a communication capability higher than that of the first communication unit to function as:
a power management unit configured to predict an amount of electric power necessary for the communication with the communication partner terminal by the second communication unit and determine, based on a relationship between remaining power and the predicted amount of electric power, whether to receive power by the power supply function of the first communication unit from a communication partner terminal; and
a communication control unit configured to, if the power management unit has determined to receive the power from the communication partner terminal, control communication with the communication partner terminal by the second communication unit using the power supplied from the communication partner terminal via the first communication unit.

5. A communication method in a communication terminal including a first communication unit having a power supply function by electromagnetic induction, and a second communication unit having a communication capability higher than that of the first communication unit, comprising:
   a prediction step of predicting an amount of electric power necessary for the communication with the communication partner terminal by the second communication unit;
   a determination step of determining, based on a relationship between remaining power and the predicted amount of electric power, whether to receive power by the power supply function of the first communication unit from a communication partner terminal; and
   a communication control step of, upon determining to receive the power from the communication partner terminal, controlling communication with the communication partner terminal by the second communication unit using the power supplied from the communication partner terminal via the first communication unit.

6. A computer-readable storage medium storing a computer program, the computer program causing a computer incorporated in a communication terminal including a first communication unit having a power supply function by electromagnetic induction and including a second communication unit having a communication capability higher than that of the first communication unit to function as:
   a determination unit configured to determine whether to receive power by the power supply function of the first communication unit from a communication partner terminal;
   a communication control unit configured to, if the determination unit has determined to receive the power from the communication partner terminal, control communication with the communication partner terminal by the second communication unit using the power supplied from the communication partner terminal via the first communication unit and control communication for settling a charge corresponding to an amount of electric power from the communication partner terminal,
   wherein the first communication unit receives the power from the communication partner terminal after settlement by settling, and
   wherein the determination unit predicts an amount of electric power necessary for the communication with the communication partner terminal by the second communication unit and,
   determines, based on a relationship between remaining power and the amount of predicted electric power, whether to receive the power by the power supply function of the first communication unit from a communication partner terminal.

7. A communication method in a communication terminal including a first communication unit having a power supply function by electromagnetic induction and including a second communication unit having a communication capability higher than that of the first communication unit, the method comprising:
   a determination step of determining whether to receive power by the power supply function of the first communication unit from a communication partner terminal;
   a communication control step of, upon determining to receive the power from the communication partner terminal, controlling communication with the communication partner terminal by the second communication unit using the power supplied from the communication partner terminal via the first communication unit; and
   controlling communication for settling a charge corresponding to an amount of electric power supplied from the communication partner terminal,
   wherein the first communication unit receives the power from the communication partner terminal after settlement in the settlement step, and
   wherein the determination step predicts an amount of electric power necessary for the communication with the communication partner terminal by the second communication unit and,
   determines, based on a relationship between remaining power and the amount of predicted electric power, whether to receive the power by the power supply function of the first communication unit from a communication partner terminal.

8. A communication terminal comprising:
   a first communication unit having a power supply function by electromagnetic induction;
   a second communication unit having a communication capability higher than that of the first communication unit;
   a determination unit configured to determine whether to receive power by the power supply function of the first communication unit from a communication partner terminal;
   a communication control unit configured to, if the determination unit has determined to receive the power from the communication partner terminal, control communication with the communication partner terminal by the second communication unit using the power supplied from the communication partner terminal via the first communication unit and control communication for settling a charge corresponding to an amount of electric power supplied from the communication partner terminal,
   wherein the first communication unit receives the power from the communication partner terminal after settlement by the communication for settling, and
   wherein the determination unit predicts an amount of electric power necessary for the communication with the communication partner terminal by the second communication unit and,
   determines, based on a relationship between remaining power and the amount of predicted electric power, whether to receive the power by the power supply function of the first communication unit from a communication partner terminal.

9. The terminal according to claim 8, wherein the communication terminal stores the power supplied from the communication partner terminal by the power supply function of the first communication unit.

10. The terminal according to claim 8, further comprising:
   a communication control unit controls communication for requesting the communication partner terminal to supply power if the determination unit has determined to receive the power by the first communication unit and control communication for requesting the communication partner terminal to stop power supply if the determination unit has determined that it is unnecessary to receive the power.

* * * * *